(12) United States Patent
Graham et al.

(10) Patent No.: US 6,864,613 B1
(45) Date of Patent: *Mar. 8, 2005

(54) ARMATURE FOR AN ELECTROMOTIVE DEVICE

(75) Inventors: Gregory Graham, Ventura, CA (US); Gerry Yankie, Santa Barbara, CA (US)

(73) Assignee: G & G Technology, Inc., Ventura, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/538,617

(22) Filed: Mar. 29, 2000

Related U.S. Application Data (63) Continuation-in-part of application No. 09/280,758, filed on Mar. 29, 1999, now Pat. No. 6,111,329.

(51) Int. Cl.[7] ........................ H02K 15/12; H02K 3/47; H02K 21/12; H02K 1/27
(52) U.S. Cl. ............. 310/195; 310/156.08; 310/156.34
(58) Field of Search ................... 310/266, 195, 310/45, 271, 264, 261, 208, 42; 336/205; 29/596, 598

(56) References Cited

U.S. PATENT DOCUMENTS

| | | | |
|---|---|---|---|
| 1,631,186 A | | 6/1927 | Apple ................ 310/266 |
| 1,738,166 A | * | 12/1929 | Apple ................ 29/598 |
| 1,789,129 A | | 1/1931 | Apple ................ 310/266 |
| 1,917,482 A | * | 7/1933 | Apple ................ 310/201 |
| 2,780,742 A | * | 2/1957 | Jenner ................ 310/179 |
| 3,154,695 A | | 10/1964 | MacGregor et al. ....... 315/139 |
| 3,209,187 A | * | 9/1965 | Angele ................ 310/266 |
| 3,312,846 A | | 4/1967 | Henry-Baudot ............ 310/266 |
| 3,324,323 A | | 6/1967 | Baudot ................ 310/203 |
| 3,441,761 A | | 4/1969 | Painton ................ 310/154 |
| 3,488,837 A | * | 1/1970 | Massouda ................ 29/598 |
| 3,532,916 A | | 10/1970 | Fisher ................ 310/266 |
| 3,551,715 A | | 12/1970 | Silvertown et al. ........ 310/179 |
| 3,562,569 A | * | 2/1971 | Koechlin ................ 310/214 |
| 3,609,431 A | | 9/1971 | Lifschitz ................ 310/266 |
| 3,623,220 A | | 11/1971 | Chase ................ 29/258 |
| 3,638,094 A | | 1/1972 | Ve Nard, II ............... 363/43 |
| 3,650,021 A | * | 3/1972 | Karol ................ 29/598 |
| 3,671,846 A | | 6/1972 | Corey ................ 363/43 |
| 3,678,367 A | | 7/1972 | McMurray ................ 363/10 |
| 3,694,907 A | * | 10/1972 | Margrain et al. ........... 29/598 |
| 3,698,079 A | * | 10/1972 | Lifschitz ................ 29/598 |
| 3,726,004 A | | 4/1973 | Holland et al. | 
| 3,763,551 A | | 10/1973 | Herron ................ 29/598 |
| 3,769,569 A | | 10/1973 | Doemen ................ 318/805 |
| 3,792,286 A | | 2/1974 | Meier ................ 307/58 |
| 3,805,104 A | * | 4/1974 | Margrain et al. .......... 310/266 |
| 3,816,907 A | * | 6/1974 | Small ................ 29/598 |

(List continued on next page.)

FOREIGN PATENT DOCUMENTS

| | | | | |
|---|---|---|---|---|
| EP | 1 103 409 A2 | | 5/2001 | |
| JP | 05328678 | | 12/1993 | |
| JP | 05328678 A | * | 12/1993 | |
| JP | 05328678 A | * | 12/1993 | ......... H02K/15/04 |

Primary Examiner—Darren Schuberg
Assistant Examiner—J. Aguirrechea
(74) Attorney, Agent, or Firm—McDermott Will & Emery LLP (57) ABSTRACT

An inductive coil for an electromotive device includes a pair of concentric conductive sheet metal winding portions each comprising a plurality of axially extending conductive bands each being separated from an adjacent conductive band by a space, each of the conductive bands of one of the winding portions being coupled to one of the conductive bands of the other winding portion, the winding portions being encapsulated in a material that extends through at least one of the spaces from an exterior portion of the induction coil to an interior portion of the induction coil.

18 Claims, 5 Drawing Sheets

U.S. PATENT DOCUMENTS

| | | | |
|---|---|---|---|
| 3,845,339 A | | 10/1974 | Merkle et al. .......... 310/156.34 |
| 3,879,650 A | | 4/1975 | Lachocki ..................... 363/131 |
| 3,944,857 A | * | 3/1976 | Faulhaber ................... 310/266 |
| 4,019,075 A | | 4/1977 | Kagami ...................... 310/206 |
| 4,070,605 A | | 1/1978 | Hoeppner ................... 318/758 |
| 4,110,901 A | | 9/1978 | Nakamura et al. ............ 29/598 |
| 4,123,679 A | | 10/1978 | Miyasaka ................... 310/266 |
| 4,129,938 A | * | 12/1978 | Hagenbucher ............... 336/205 |
| 4,187,453 A | | 2/1980 | Rough ........................ 318/135 |
| 4,225,914 A | | 9/1980 | Hirata et al. ................. 363/160 |
| 4,268,810 A | * | 5/1981 | Iwasa et al. ................. 336/205 |
| 4,271,370 A | | 6/1981 | DiMeo |
| 4,321,494 A | * | 3/1982 | MacNab ..................... 310/194 |
| 4,599,686 A | | 7/1986 | Muller et al. .................. 363/41 |
| 4,645,961 A | * | 2/1987 | Malsky ................. 310/156.07 |
| 4,808,873 A | * | 2/1989 | Rowe et al. ................. 310/260 |
| 5,004,944 A | | 4/1991 | Fisher ........................ 310/266 |
| 5,041,768 A | | 8/1991 | Herrmann ................... 318/138 |
| 5,130,596 A | * | 7/1992 | Umeki ......................... 310/44 |
| 5,132,892 A | | 7/1992 | Mizoguchi ................... 363/41 |
| 5,270,602 A | | 12/1993 | Takehara .................... 310/198 |
| 5,294,875 A | | 3/1994 | Reddy ........................ 318/801 |
| 5,331,244 A | | 7/1994 | Rabe .......................... 310/180 |
| 5,650,708 A | | 7/1997 | Sawada et al. .............. 318/801 |
| 5,714,828 A | * | 2/1998 | Ackermann et al. ......... 310/266 |
| 5,793,138 A | * | 8/1998 | Kliman et al. ............... 310/211 |
| 5,798,623 A | | 8/1998 | El-Sadi ....................... 318/254 |
| 6,026,558 A | * | 2/2000 | Yoshida et al. ................ 29/598 |
| 6,111,329 A | | 8/2000 | Graham et al. ................ 310/42 |
| 6,175,178 B1 | | 1/2001 | Tupper et al. ............... 310/166 |
| 6,184,640 B1 | | 2/2001 | Kawashima ................. 318/461 |
| 6,198,184 B1 | | 3/2001 | Ohi et al. .................. 310/68 C |
| 6,204,618 B1 | | 3/2001 | Wang et al. ................. 318/431 |
| 6,218,760 B1 | | 4/2001 | Sakuragi et al. ............. 310/254 |
| 6,236,126 B1 | | 5/2001 | Yagi et al. ..................... 310/51 |
| 6,236,133 B1 | | 5/2001 | Nishikawa et al. .......... 310/179 |
| 6,239,567 B1 | | 5/2001 | Sunaga et al. ............... 318/432 |
| 6,304,045 B1 | | 10/2001 | Muszynski .................. 318/439 |
| 6,348,775 B1 | | 2/2002 | Edelson et al. .............. 318/727 |
| 6,351,052 B1 | | 2/2002 | Kim ........................... 310/179 |
| 6,459,221 B1 | | 10/2002 | Dreher et al. ................ 318/254 |
| 6,568,065 B2 | | 5/2003 | Graham et al. ................ 29/596 |
| 6,570,361 B1 | | 5/2003 | Edelson ...................... 318/801 |
| 2001/0015904 A1 | | 8/2001 | Kimura ....................... 363/131 |
| 2001/0030519 A1 | | 10/2001 | Baum ......................... 318/254 |
| 2003/0053323 A1 | | 3/2003 | Kimura et al. ................. 363/98 |

* cited by examiner

CURRENT ELEMENT

*FIG. 10a*
(Prior Art)

CURRENT ELEMENT

*FIG. 10b*
(Prior Art)

CURRENT LOOP

ARMATURE FOR AN ELECTROMOTIVE DEVICE

CROSS-REFERENCE TO RELATED APPLICATIONS

The present application is a continuation-in-part of U.S. patent application Ser. No. 09/280,758, filed Mar. 29, 1999 now U.S. Pat. No. 6,111,329, priority of which is hereby claimed under 35 U.S.C. § 120, and the contents of which is hereby incorporated by reference as though set forth in full herein.

FIELD OF INVENTION

The present invention relates to electromotive devices and more particularly to an ironless core armature for an electric motor.

BACKGROUND OF INVENTION

Electric motor manufacturers and in particular DC motor manufacturers have traditionally employed wire winding or printed circuit coil techniques to fabricate ironless core armatures, which move in a magnetic flux air gap. There, however, are a number of problems associated with these designs. Ironless core motors are typically run with a larger gap than conventional iron core designs. The iron core motors have wire wound through a core of magnetically permeable material and the iron core is cut to minimize the gap but iron core motors have more mass in the armature than ironless core motors.

In the wire winding case, the insulated wire is wrapped in a multilayer configuration to form the current carrying coil with a specific conductor to insulation volume ratio known as packing density. With typical circular coil wire, the insulation material and air voids inherent in this coil construction make for a less than optimal conductor packing density. If square or rectangular conductors are used for armature winding, both the packing density of the coil as well as the total volume of conductor within the magnetic gap are increased. Coil wire is usually circular wire which consists of an electrical conductor (copper or aluminum) surrounded by an insulation layer on top of which there is a bonding layer for structural stability. In most prior art armature wire windings of this type, the conductor packing density is about 60%. If square wire is used in traditional armature production instead of circular wire, the conductor packing density is increased to 70%–80%. Manufacturers, however, prefer using circular wire due to its lower material and labor cost and ease of manufacturing. Therefore, a need exists for a new armature design that is cost effective to produce and that would result in a higher conductor packing density as well as a higher volume of conductor in the magnetic gap. Some ironless core armatures are wire wrapped in angular fashion allowing conductor to conductor bonding for ease of manufacturing and structural integrity which is less efficient because electron flow should be at 90 degrees to the magnetic flux path for maximum efficiency. Angular wrapped armatures exhibit reduced torque by the sine of the angle of the current to the magnetic field. The structure of wire wrapped armatures makes it difficult to produce long small diameter armatures with adequate strength to withstand the destructive centrifugal forces of high RPM applications.

Armatures built by Printed Circuit manufacturing techniques involve rotor windings being formed as flexible printed circuits. Printed circuits are circuits in which the conducting material is applied to an insulated support base by adhesives and etched from one side. The amount of electrical conductor in this case is compromised, however, as multiple layers of insulated printed circuit traces tend to result in a thicker armature wall and a diminished conductor packing density. The packing density of this type of armature is lowered due to the volume of flexible printed circuit insulation material used to support the conductive loops during fabrication. Reducing the armature wall thickness with thin wraps of printed circuit traces tends to weaken armature walls and yield higher electrical resistance due to narrower and thinner conductor traces. Higher electrical resistance results in an undesirable increase in motor heat and energy dissipation, thus causing power losses equal to $P=I^2R$. Alternatively, wider printed circuit traces improve motor performance by reducing trace electrical resistance, but allow eddy currents, which reduce the overall gain by again increasing the effective electrical resistance. Printed circuit construction can be found in larger gap motors where multiple layers are used to create multiple turn coils, to increase the length of conductor in the magnetic field. This results in a thicker armature structure and a larger magnetic gap. These flexible circuits are mostly used in brushless motor applications where the windings are held stationary and the magnet is rotated. The larger number of windings creates an armature of larger inductance and higher electrical resistance.

Various attempts have been made in the prior art to improve ironless core armature performance. For example, U.S. Pat. No. 3,944,857 to Faulhaber discloses an air-core or ironless core armature for electrodynamic machines having an elongated insulating strip rolled up to form a spiral structure composed of a number of radially successive layers. An armature winding is comprised of at least one armature coil and each coil is comprised of a number of electrically interconnected component coils. Each coil is formed of electrically interconnected conductor sections printed on both sides of the insulating strip. This set up, unfortunately, does not optimize the configuration of the windings so as to produce optimal torque.

U.S. Pat. No. 3,805,104 to Margrain is directed to a hollow insulating cylinder with conductors which are placed over an internal metallic tubular support which is supported by an end disk at one end, and open at the other end, the open end being flared for stiffness. The cylinder has insulation with the electrical conductors being in printed or laminated circuit form. This type of device, however, compromises the conductor packing density factor and does not produce optimal torque.

Figures 10A, 10B:
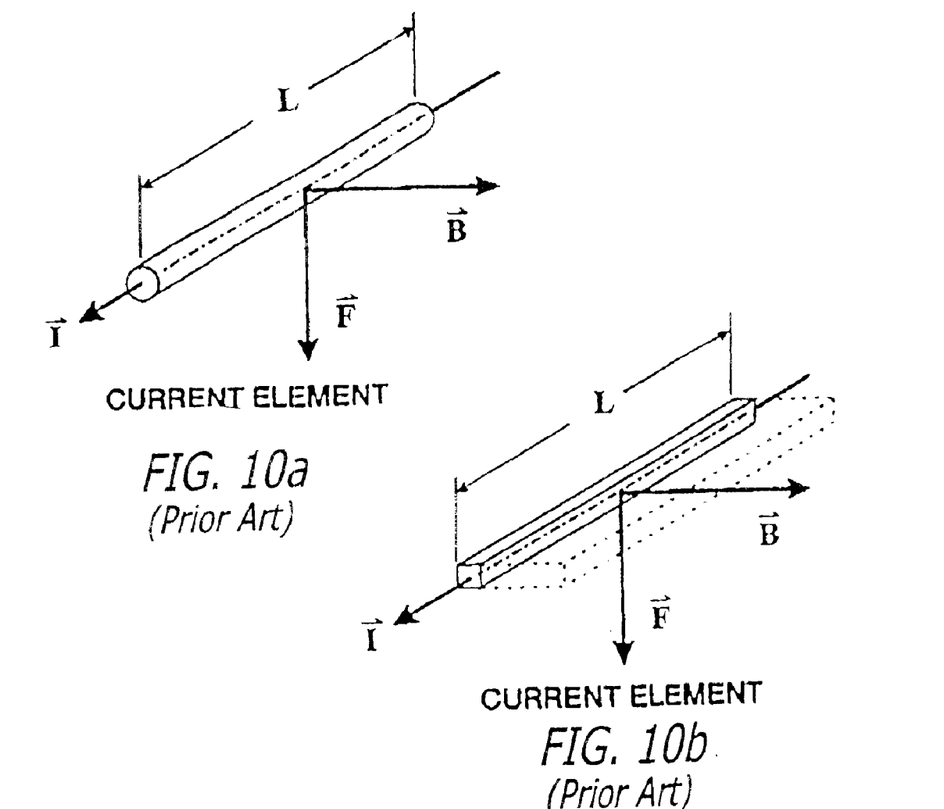
FIG. 10a is a graphic theoretical explanation of the Lorentz Force in a conventional wire wound armature.
FIG. 10b is a graphic theoretical explanation of the Lorentz Force in accordance with an embodiment of the present invention.
Figure 10C:
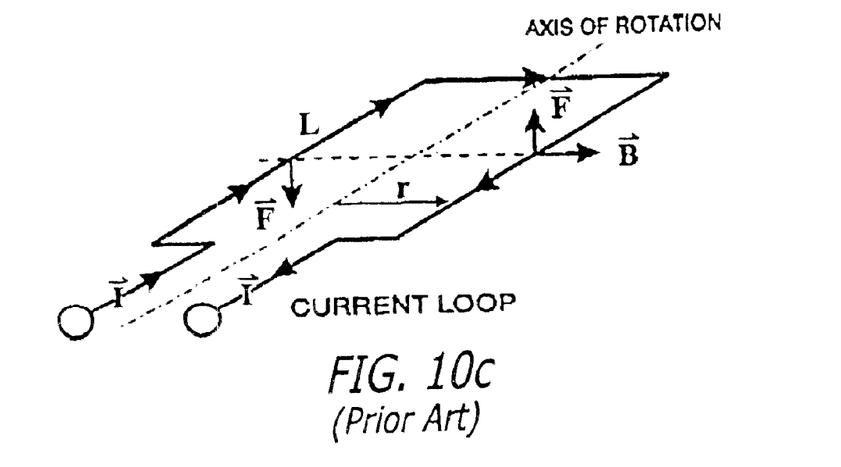
FIG. 10c graphically illustrates the application of the Lorentz Force in a typical electric motor armature.

The Lorentz Law for Electromotive Devices is $F=I\times L\times B$; where F=Force, I=current, L=conductor length, B=magnetic flux density. The Lorentz Law theory as it applies to electric motors is clearly illustrated in FIGS. 10a, b and c. FIG. 10a illustrates the environment we see in traditional wire wound armatures in use today. Wire wound conductors must have wire insulation which decreases the carrier packing density and thereby the current density per unit area, and thereby the inability to uniformly mount the armature in such manner to cut a maximum of flux lines. In addition, wire wound armatures must be wound at an angle thereby creating a angle between the crossed vectors of Current and Magnetic Flux that is less than the maximum desired ninety degrees to yield the greatest force.

FIG. 10b illustrates the metal strip carriers envisioned by an embodiment of the invention disclosed herein. It can be observed that a square cross section of FIG. 10b will enable a greater proximity of the flat sided current carrier to the means from which the magnetic flux emanates/terminates in the gap between current flow/conductor and said means where the greatest flux density exists. The round cross section of a conventional wire wound armature does not permit such close proximity of the current carrier and the magnetic field carrier. In addition, the square cross section can be increased to a rectangular cross section as indicated in FIG. 10b to yield an even greater current density and flow in a very much reduced magnetic flux gap where the flux density is at its greatest.

Incorporating the complete current loop illustrated in FIG. 10c, it becomes very apparent that the doubled Lorentz Force resulting from the same force on each arm of the conductor and imposed on the flat conductor surface of FIG. 10b will be substantially increased by the increased current density, increased flux density and a maximum ninety degree angle between the current and the flux. This is the substantial factor in the Lorentz Force equation. Conventional wire wound armatures are disposed at an angle to the Magnetic Flux Density; therefor, the Current (I) vector/flow is at an angle to the Magnetic Flux (B) vector which of necessity yields a smaller resulting Lorentz Force (F).

The vector diagrams of FIGS. 10a, b and c clearly illustrate that the force (therefore torque) on the armature of the type described above can be increased by optimizing or increasing each of the terms of the equation. In particular, current (I) flow may be maximized by reducing the electrical resistance of the conductor coil. In a specific armature design, conductor length (L) increases can be obtained from multiple conductor loops. Magnetic flux density (B) can be maximized by minimizing the air gap between the magnetic return structure and the magnet wherein the armature rotates, that is, the closer the magnetic return path is to the magnet, the higher the magnitude of the magnetic flux density (B) will be. For any given current in the windings of the armature, which is placed in the higher magnetic field, torque will be increased. Therefore, to improve efficiency of the traditional motor, an armature manufacturer or designer should strive to reduce the armature wall thickness which will result in the ability to reduce the size of the magnetic gap creating higher flux density, this should be accomplished without sacrificing conductor length or increasing conductor resistance. Positioning the armature wall in close proximity to the magnetic field origin and return path will allow for more conductor volume for a given gap width, less electrical resistance and result in an increase in the conductor density within the gap.

SUMMARY OF THE INVENTION

In one aspect of the present invention, an inductive coil for an electromotive device includes a pair of concentric inner and outer sheet metal winding portions separated by a continuous non-conductive fiber strand extending around the circumference of the inner winding portion a plurality of times to form an insulation layer, each of the winding portions comprising a plurality of axially extending conductive bands with each of the conductive bands of one of the winding portions being coupled to one of the conductive bands of the other winding portion, the inductive coil being encapsulated with a material that impregnates the winding portions and the insulation layer.

It is understood that other embodiments of the present invention will become readily apparent to those skilled in the art from the following detailed description, wherein it is shown and described only embodiments of the invention by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWING

These and other features, aspects, and advantages of the present invention will become better understood with regard to the following description, appended claims, and accompanying drawings where:

DETAILED DESCRIPTION OF A PREFERRED EMBODIMENT

An embodiment of the presented invention is directed to an ironless core armature for a D.C. motor with brushes. The armature has a composite construction allowing high temperature operation, high speed and high torque compared to other brush motors. Preferably, the armature is a precision-machined rectangular sheet metal, copper or copper alloy, machined in a pattern to produce a series of generally parallel conductive bands with each band separated from the other by a fine fiber and polyimide. This approach allows the construction of long armatures with small diameter to length ratios. The machined, cold rolled, tempered and conductive metal sheets are rolled to form a cylinder with the orientation of the conductive band pattern on one cylinder representing a half-electrical circuit and the other half circuit representing the conductive band pattern of the other cylinder. One cylinder, also called the inner cylinder, has a slightly smaller diameter than the other so as to fit inside the larger diameter cylinder (also called the outer cylinder). The outer surface of the inner cylinder is tightly wrapped with sufficient layers of threadlike fiberglass strands or other non-conductive filaments, which provides insulation, spacing and structural stability. The sheet metal has structural temper, and this tempered feature contributes to the overall strength of the armature structure. The table below shows the increase in stiffness and strength provided by tempered, coiled rolled copper.

| Properties of Materials: | Cold Rolled Copper | Annealed Copper |
| --- | --- | --- |
| Tensile Strength | 46,000 psi | 32,000 psi |
| Yield Strength | 40,000 psi | 10,000 psi |
| Percent Elongation | 5% | 45% |
| Hardness, Brunell | 100 | 42 |

The structural copper provides adequate stiffness and longitudinal support for the armature eliminating the need for laminated support required of conventional printed circuit board armature types. Rolling provides additional work hardening via cold forming. The conductors are formed as arcs, creating a three dimensional shape of each conductor. This allows all the conductors, that are stiffened by the rolling process, to become self supporting.

The fiberglass wrapped inner cylinder is inserted into the outer cylinder by concentrically and axially aligning the end points of the conductive bands of each cylinder on both ends. The outer surface of the outer cylinder structure is also wrapped with several layers of fiberglass strands to impart a cross woven, strengthening layer. The outer and inner cylinder conductive bands are then soldered, or otherwise electrically attached, at their respective connection points to form a continuous electrically conductive coil with bare fiber providing spacing between the conductive layers. When this assembly is subsequently encapsulated with a non-conductive material, the end result is a thin-walled, tubular, freestanding electrically conductive coil that creates a rigid armature structure with a high percentage of conductor to non-conductor material. This armature is capable of much higher rotational speeds, higher temperature and torque than conventional constructed ironless core armatures.

The described embodiment of the ironless core armature has numerous applications and can be integrated into a variety of devices. By way of example, the free-standing electrically conductive coil can be provided with a disc-shaped commutator, having a series of conductive radial segments which mount to one end of the coil, which collects current from the motor brushes and distributes the current to the inductive coil. The coil can be further provided with an insulated disc-shaped flywheel mounted inside the coil and bonded to the commutator and the inside diameter of the coil. Preferably, the flywheel has a diameter designed to fit snugly inside the inner cylinder so that the flywheel is held in contact with the electrical conductors, providing torque translation to the output shaft. The armature also can have a metal shaft axially inserted inside the coil from the center of the flywheel and the center of the commutator with a portion of the shaft protruding from at least one end of the coil. The shaft can be frictionally held in a position by the flywheel. The assembled armature can then be mounted via its shaft in any D.C. motor having brushes with the coil rotating on its shaft in a thin magnetic flux air gap during operation.

Figure 1A:
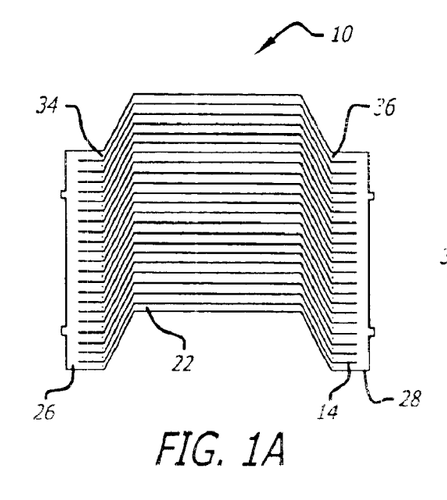
FIGS. 1a and 1b is a plan view of a pair of copper metal sheets, precision machined in accordance with an embodiment of the present invention.
Figure 1B:
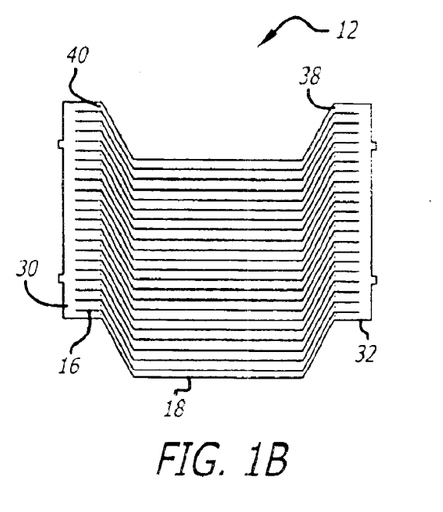

Referring to FIGS. 1a and 1b, a preferred embodiment of the present invention is shown having a conductive coil constructed from a pair of nearly mirror image, electrically conductive and precision-machined pieces of bare, tempered conductive sheet metal such 10 and 12. The first metal sheet 10 is preferably made of tempered copper grade 110 with and precision machined in a pattern to produce a series of generally parallel conductive bands 22 with each band being separated from the other by an elongated machined cutout 14. Similarly, the second metal sheet 12 is preferably made of tempered copper grade 110 and precision machined in a pattern to produce a series of generally conductive bands 18 with each band being separated from the other by an elongated machined cutout 16. The machined cutouts are identical and subsequently filled with encapsulation material to prevent electrical contact between neighboring bands. The preferred thickness of each cutout is about 1–1.5 times the conductor thickness. In contrast, printed circuit board armature etching is performed from one side of the material resulting in a cutout thickness of 2.5 to 3.0 times that of the conductor. The thickness of the machine cutout in accordance with the described embodiment of the present invention is narrower than that encountered with convention printed circuit technology and is intended to optimize the current flow by removing less material and increase the number of conductive bands that can be precisioned machined on copper sheet metal. By way of example, for a ½" diameter by 2" long armature, each copper metal sheet is preferably 2 inches by 3 inches (approx. 5 cm×7.5 cm) with a thickness of about $0.005/0.010$ inch ($0.12/0.24$ mm) and a cutout thickness of about $0.005/0.015$ inches ($0.12/0.36$ mm). As those skilled in the art will appreciate other dimensions and materials may be used to manufacture conductive the metal sheets.

The desired pattern can be achieved in a variety of ways, including by way of example, by precision cutting the metal sheet by chemical machining. Alternatively, the desired pattern can be machined by other techniques such as water jet cutting, laser cutting, electron beam cutting, fine blanking or any other conventional machining methods. The chemical machining allows both sides of the conductor to be etched at the same time which reduces the amount of copper removed by 50% compared with conventional printed circuit board single side etching.

The first metal sheet 10 has a carrier strip on each edge 26 and 28. Similarly, the second metal sheet also has a carrier strip on each edge 30 and 32. The carrier strips support the conductive bands at each end and are subsequently removed as explained herein below. The conductive pattern for the first metal sheet 10 includes a series of relatively small holes 34 and 36. Similarly, the conductive pattern for the second metal sheet 12 also includes a series of relatively small holes 38 and 40. The preferred diameter of each hole is about 0.25 mm. The preferred total number of holes on each side is equal to the number of conductive bands. It will be appreciated that armature coils of this type may be constructed from sheet metal pieces having less or more conductive bands or holes depending on various DC motor operational requirements.

Figure 2:
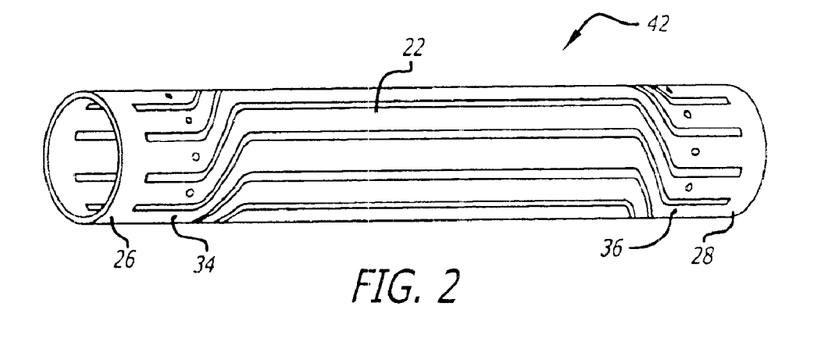
FIG. 2 is an elevational perspective view of the precision machined sheet metal pieces of FIG. 1a rolled into a cylinder in accordance with an embodiment of the present invention.
Figure 3:
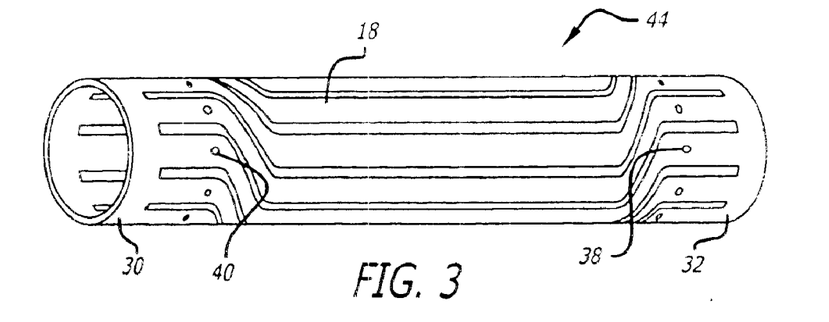
FIG. 3 is an elevational perspective view of the precision machined sheet metal of FIG. 1b rolled into a cylinder being the near mirror image of the cylinder of FIG. 2 in accordance with an embodiment of the present invention.

In the described embodiment, the first metal sheet 10 is rolled into a thin-walled cylindrical shape 42 as shown in FIG. 2. The second metal sheet part 12 is also rolled into a thin-walled cylindrical shape 44 as shown in FIG. 3, but with its pattern of conductive bands and machined cutouts specifically oriented to create a near mirror image of the pattern of conductive bands and cutouts of the first metal sheet 10. The preferred diameter of the first cylinder 42 is about 0.510 inch (approx. 2 cm) and the preferred diameter of the second cylinder 44 is about 0.520 inch (approx. 2 cm). The first cylinder 42 is formed with a slightly smaller diameter to allow subsequent placement of the same into the second cylinder 44 to form the conductive coil. For this reason, the second cylinder 44 will hereafter be referred to as the outer cylinder and the first cylinder 42 will respectively be referred to as the inner cylinder. Those skilled in the art will appreciate that other size cylinder diameters may be utilized.

Figure 4:
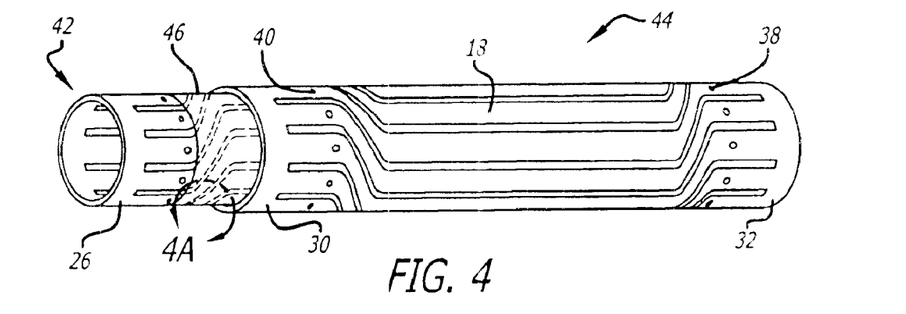
FIG. 4 is an elevational perspective view of the cylinder of FIG. 2 being inserted into the cylinder of FIG. 3 to form a cylindrical electrically conductive coil in accordance with an embodiment of the present invention.
Figure 4A:
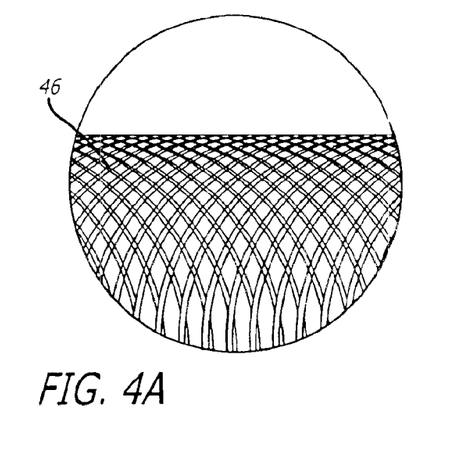
FIG. 4a is a blow up of a portion of FIG. 4 illustrating detail of the wound and cross woven fiber spacing layer providing internal and external composite strengthening to the entire coil assembly.

Next, the inner cylinder 42 is placed on a cylindrical shaft and four to five layers of fine industrial grade fiberglass strands 46 as shown in FIG. 4, preferably having a thickness of about 0.00015 inch, are wrapped and cross woven over the entire outer surface for insulation and composite strengthening while at the same time avoiding the carrier strips of the inner cylinder 42. The wrapped multiple layers of fiberglass strands over the outer surface of the inner cylinder 42 provides structural support for the tubular structure. The fiberglass weave also provides physical separation between the inner cylinder 42 and the outer cylinder 44. The preferred thickness of the fiberglass layers is approximately 0.00030–0.00075 inch, and is therefore, extremely small but adds significant strength and sufficient insulating capability.

The stranded fiberglass wrapped inner cylinder 42 is then inserted into the outer cylinder 44 (i.e. inner cylinder 42 and outer cylinder 44 are of equal length) with the insertion carried out ensuring concentric and axial alignment of both cylinders and matching of respective conductors on each end of the inner cylinder 42 with the corresponding conductors on each end of the outer cylinder 44.

The next step is to wrap and cross weave four to five layers of industrial grade fiberglass strands over the outer surface of the outer cylinder 44 in the same way as was done with the inner cylinder 42. This fiberglass layer is used for spacing, strength and structural support. The preferred thickness of the outer cylinder fiberglass layers is approximately 0.00030–0.00075 inch. The electrical insulation and armature structural strength required depends on the application of the DC motor being produced. The 0.00075 inch material thickness along with the subsequent encapsulation material has been shown to be sufficiently strong to withstand centrifugal forces of rotational speeds in excess of 45,000 RPM. The resulting encapsulation material has a dielectric strength of 600 volts/0.001 inch which gives 180 volts isolation at the 0.0003 inch thickness, sufficient for operations at 0–60 volts.

Soldering of the interconnect pads of each conductor using, preferably, a lead-silver-tin solder material which can withstand operational temperatures as high as 510 degrees Fahrenheit (F°). This interconnect can be welded instead of soldered to create an interconnect with copper as the base weld material to allow even higher armature temperatures. A DC motor with the described embodiment of the armature coil will tolerate higher operational current and thus higher operational temperature due to the high temperature capability of solder and encapsulation material used. Alternative methods of joining the conductors may be used, such as crimping, spot welding, sonic welding or laser welding. If one of these welding techniques is used, the armature operational temperature rises to about 600 degrees F°, which is the utilization temperature of the described embodiment of the encapsulation material.

Figure 5:
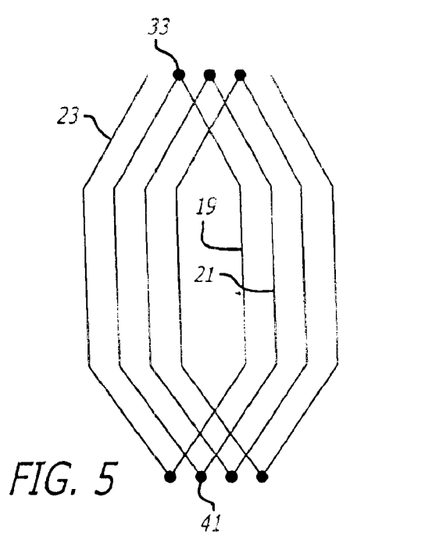
FIG. 5 is a graphic illustration of the electrical interconnection of conductive loops to form a continuous electrically conductive coil in accordance with an embodiment of the present invention.

The soldered joints electrically interconnect all the outer cylinder 44 conductive bands with the respective inner cylinder 42 conductive bands so as to form a continuous, inductive helical structure as shown in FIG. 5. FIG. 5 illustrates in detail how a portion of the helical structure is accomplished. For example, the inner cylinder conductive band 23 is electrically connected at one end (hole 33) with the outer cylinder 44 conductive band 19 and at the other end (hole 41) with the outer cylinder conductive band 21. The rest of the inner cylinder 42 conductive bands are similarly interconnected with the respective outer cylinder 44 conductive bands with the total number of interconnections at each end being the same. Essentially, the inner cylinder 42 conductive bands provide one half of the electric circuit and the outer cylinder 44 conductive bands provide the other half of the electric circuit. Joining the two halves completes the electric circuit. This construction is typically called a lap wind. A wave wind may be achieved as well. Prior art armatures are sometimes thicker at the ends to accommodate wire minimum bend radius problems, whereas the described embodiment of the armature may be constructed such that it is no thicker at the ends than anywhere else along the armature wall. This allows insertion of the completed structure through a narrow gap in the final assembly.

Figure 6:
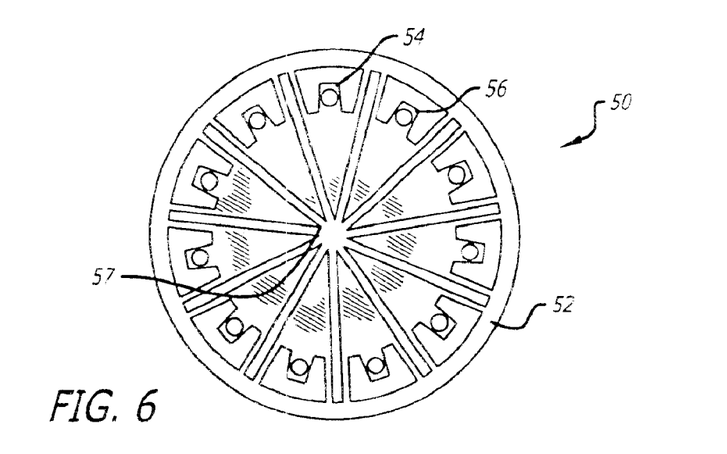
FIG. 6 is a plan view of a commutator in accordance with an embodiment of the present invention.

FIG. 6 depicts a commutator 50 constructed by precision machining a thin metal sheet, preferably tempered hard copper alloy like Beryllium/Copper, in the pattern shown which will reduce the commutator surface wear due to the hardness of the material. Beryllium/Copper wear rates in sliding contact is better than pure copper for longer armature life. The commutator 50 has a carrier ring 52 which supports eleven segments such as segments 54, 56, among others. The commutator segments are soldered to matching solder points on the outside of the outer cylinder 44. The commutator 50 collects current from the DC motor brushes and provides power (or distributes current) to the helical coil circuit of the cylinder assembly via its current conducting segments. The eleven tabs at opening 571 and the eleven segments are bent at 90 degrees to the commutating surface using a cold forming tool. This step prepares the commutator for solder attachment to the completed armature coil 62 of FIG. 8. Before commutator mounting can be accomplished, the carrier strip 30 from the outer cylinder 44 (FIG. 3) and the carrier strip 26 from the inner cylinder (FIG. 2) are removed by cold forming in preparation for attaching the commutator 50. After soldering or welding the commutator 50 to the armature coil 62, the carrier ring 52 (FIG. 6) is removed from the commutator 50 by cold forming. A conventional radial commutation scheme can be used to provide the necessary commutation.

Figure 7:
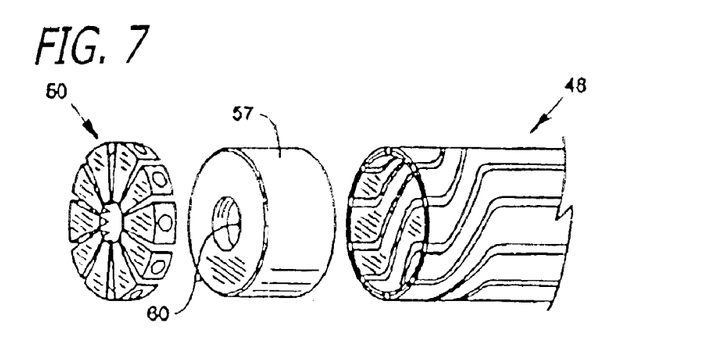
FIG. 7 is an exploded perspective view of an ironless core armature being assembled in accordance with an embodiment of the present invention.

FIG. 7 illustrates an ironless core armature in accordance with a preferred embodiment of the present invention being assembled from a coil 48 (which is the cylinder assembly described above), a commutator 50 and a disk-shaped flywheel 57. The flywheel 57 can be provided with a circular central opening 60 for fitting a shaft 58 (FIG. 9) and is preferably made from high-strength aluminum. The flywheel 57 can be anodized on its exterior surface to create a consistent electrical insulation layer over the outer surface. The flywheel 57 should be capable of current and voltage isolation via a non-conductive anodized coating and yet have high thermal mass, heat transfer characteristics and stiffness to transmit torque and securely fix the shaft. The diameter of flywheel 57 should be a line to line fit with the diameter of the inner cylinder 42 to allow snug fit of the flywheel inside the inner cylinder 42 when the flywheel is subsequently pressed into one end of the inner cylinder 42. Other materials such as ceramic, high-strength glass and the like may be employed to manufacture the flywheel.

Again, the order of assembly of the described embodiment of the armature is to first press-fit flywheel 57 into one of the open ends of coil 48 (FIG. 7). Next, the commutator 50 tabs are soldered (using the type of solder material as previously described) over the electrically joined interconnections of the cylinder assembly 48. In this case, since the total number of commutator segments is eleven and the total number of soldered holes is twenty-two, one segment will service two solder holes (or electrical interconnections) on the cylinder assembly. This type of commutator construction allows for a relatively large number of commutation segments to be utilized which results in a reduced number of coils at each switch of the commutator thus reducing commutator sparking.

Back emf follows from Faraday's Law, that is, when an electrically conducting loop is in motion in a magnetic field, a voltage is induced in the loop. In DC motors, the rotation of the armature winding (or coil) in the presence of a magnetic field results in an induced voltage in the armature coil. This voltage is called "back emf" and is undesirable during motor operation. The use of a relatively large number of commutator segments (eleven) is an improvement over known commutators, which normally use 2–9 segments. It should be appreciated that the number of soldered points on the cylinder assembly in accordance with the preferred embodiment of the present invention is a multiple of the number of commutator segments. In this case, the total number of soldered holes, twenty-two, is a multiole of (i.e. 2×11=22) the total number of commutator segments, eleven. Other multiples may be produced as well in accordance with the present invention such as 3×, 4×, etc. The commutator 50 can also be made from a conductive material other than pure copper to resist mechanical abrasion at the brush/commutator interface and yet maintain high conductivity.

The assembled components provide a completely assembled motor armature less shaft and encapsulation containing metal and fiber only. The assembled armature is then subjected to encapsulation with a non-conductive coating and bonding material to provide additional structural stability, to permanently secure all components and to provide complete electrical insulation of the armature. By way of example, the armature can be dipped into a polyimide solution which preferably includes 25% solid/solute (polyimide) and 75% solvent. Polyimides are known for their high thermal resistance and are also non-flammable due to their aromatic, halogen-free structure that manifests itself in a very high limited oxygen index (about 38%). When subjected to flame, polyimide has very low level of smoke formation and toxic gas formation, which makes it a preferred bonding agent for this armature. Polyimide is also chemically resistant to organic solvents such as alcohol, ketones, chlorinated hydrocarbons, and has low moisture absorption.

The dipped armature is then centrifuged. The centrifugal force pushes the polyimide deeply into the fiber material to properly displace air and wet all surfaces, crevices and cracks of the tubular structure allowing permanent composite encapsulation and insulation of the components.

The polyimide-dipped armature is preferably heat-cured at about 450 F° to remove solvents and to yield a hardened, polyimide encapsulation of the armature. The limitation to the curing temperature is the 510 F° solder flow temperature; however, using non-solder welding techniques allow polyimide curing at 695 F° and continuous armature operating temperatures of 600 F°. The polyimide material is cured to a rigid material state. The shrinkage of the material as the solvent is driven off by heat tightens the structure. This allows for a rigid armature capable of high resonance, speed and torsion stiffness. Other potting and encapsulation materials may be used such as ceramic, glass, silicates, silicones, etc.

Figure 11:
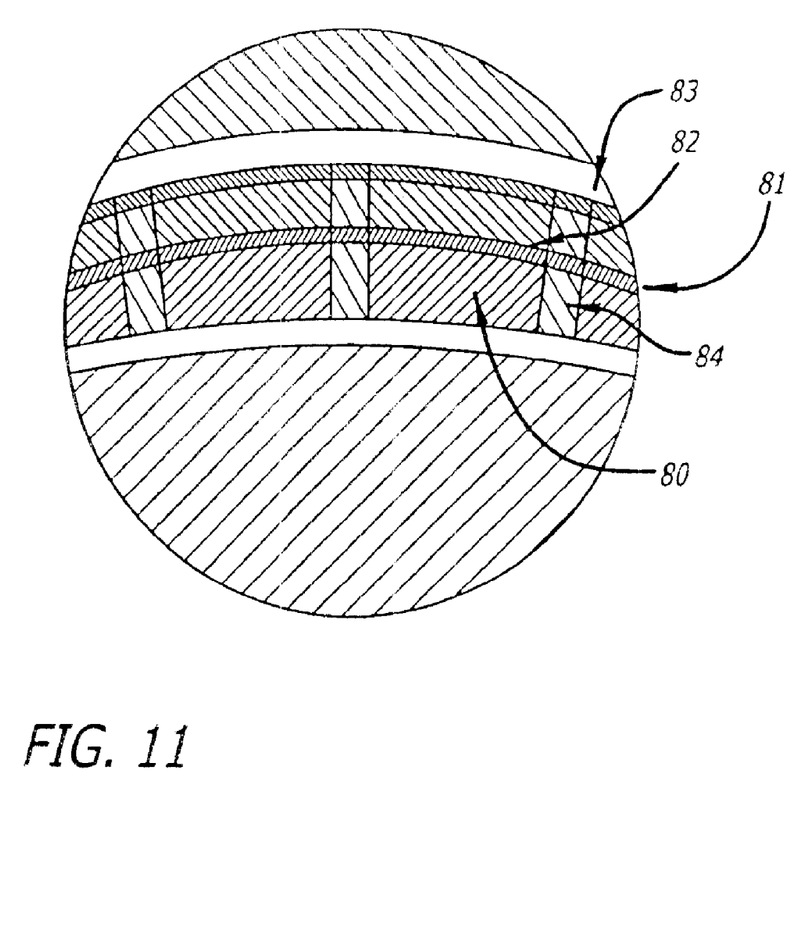
FIG. 11 graphically illustrates the cross section of the armature.

FIG. 11 shows a cross section of the armature wall. The armature structure has few materials with the insulation/fiber spacing layer a very small percentage of the total wall thickness. The final construction of the armature wall from inside out consists of a copper metal sheet 80 with polyimide encapsulation material 84 filling the conductor voids, fiber and polyimide 81, a copper sheet metal sheet 82 with polyimide encapsulation material 85 filling the conductor voids, and fiber and polyimide 83. After the shaftless armature has been heat-cured, it is allowed to cool to room temperature. Upon inserting a shaft, the end product is a strong, stiff and fully insulated armature that can be used in any DC motor application having brushes for sliding electrical contact. It is worth noting that the cured shaftless armature has very low moisture absorption due to the composition of its components, namely copper, high-quality soldering material, fiberglass and polyimide. This makes the described embodiment of the armature an excellent choice for a DC motor for medical/dental use, as repeated heat sterilization or autoclave runs will not affect the operation of the armature. Furthermore, the limiting operational temperature of a DC motor equipped with the inventive armature is about 450 F° which is a considerable improvement over prior art DC motors which can operate at a limiting temperature of about 325 F°.

Figure 8:
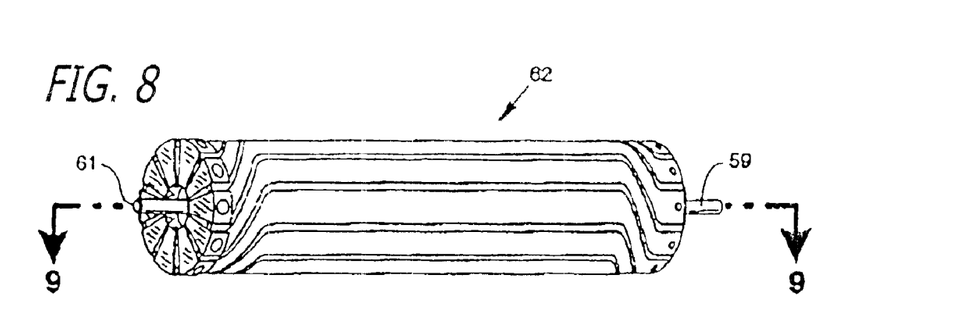
FIG. 8 is an elevational perspective view of an assembled ironless core armature with drive shaft and flywheel inserted, commutator electrically connected to the electrically conductive coil in accordance with an embodiment of the present invention.
Figure 9:
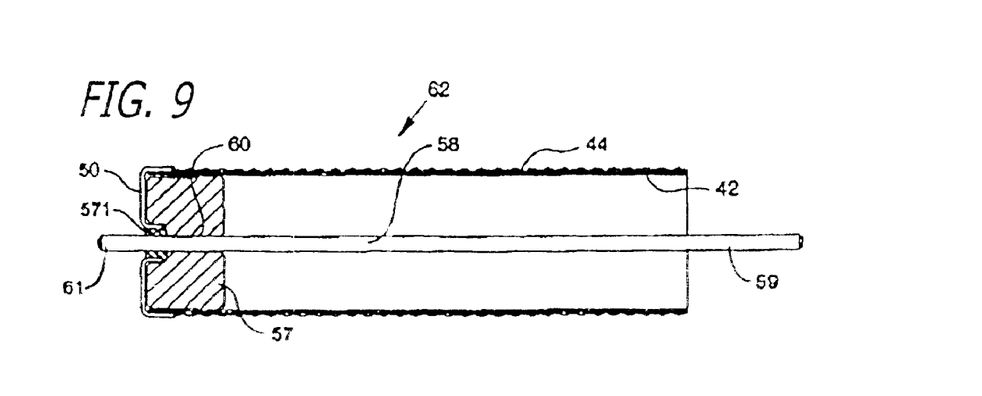
FIG. 9 is a cross-sectional view along section line 9—9 of FIG. 8.

FIGS. 8 and 9 illustrate a fully assembled freestanding ironless core armature 62 for a DC motor with brushes in accordance with a preferred embodiment of the present invention. The armature 62 includes the axially inserted shaft 58 with portions 59 and 61 protruding out each end for motor mounting. Before the shaft 58 can be mounted, the carrier strip 28 from the inner cylinder 42 and the carrier strip, 32 from the outer cylinder 44 (FIGS. 2&3, respectively) are cut off by cold forming. This removal of the carrier strips completes the isolation of the individual helical segments thereby creating a continuous coil loop around the armature. The shaft 58 is preferably made from hardened stainless steel and is press-fit axially inside the inner cylinder 42 passing through opening 60 of the already mounted flywheel 57 and through opening 471 of the already mounted commutator 50. The preferred dimensions of the shaft 58 are ⅛" diameter×2½" long. Other materials and dimensions may be used to manufacture the shaft 58.

FIG. 9 is a cross-sectional view of armature 62 showing the frictional connection of the shaft 58 inside the opening 60 being held in place by the flywheel 57.

Due to the excellent penetration properties of the polyimide encapsulation material and the very thin coil wall of the described embodiment of the armature, the gap between the magnetic return path and the magnet is minimized which optimizes the magnetic flux density in the thin air gap in which the rotor moves producing greater motor torque than known armatures of similar size. Performance variations due to assembly irregularities are also reduced to a minimum using the described coil assembly process. The assembly variables are insignificant to the extent that the armature does not require dynamic balancing for operation, below 45,000 RPM. Additionally, the assembly precision allows the armature walls and gap walls to be positioned extremely close with spacing of 0.002/0.005 inch (0.05/0.12 mm) between moving and non-moving walls (air gap and armature surfaces) which increases the total conductor to air gap packing density. The materials used in the design of the described embodiment of the armature all exhibit very high temperature resistance which results in a stable armature capable of operating under various high temperature conditions. Moreover, the armature is extremely cost effective to manufacture when compared with competitive armature manufacturing costs.

It is conceived that the described embodiment of the armature of the present invention can be used in a variety of applications such as drills (dental, medical, commercial), hobby craft, automotive, aerospace, photocopiers, printers, robotics, disc drives and motion control devices, as well as other known devices. For example, the above described armature can also be employed in brushless DC motors. In such applications, the armature of the brushless motor designs will have only the freestanding, thin-walled, non-rotating helical inductive coil driving a magnet/shaft assembly, which would become the rotating element. In brushless motor designs, the same principles apply where the magnetic flux air gap and conductor (copper) density improvements create better motor performance.

Although a preferred embodiment of the present invention has been described, it should not be construed to limit the scope of the appended claims. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. An inductive coil for an electromotive device, comprising:
   a pair of concentric inner and outer sheet metal winding portions separated by a continuous non-conductive fiber strand extending around the circumference of the inner winding portion a plurality of times to form an insulation layer, each of the winding portions comprising a plurality of axially extending conductive bands with each of the conductive bands of one of the winding portions being coupled to one of the conductive bands of the other winding portion, the inductive coil being encapsulated with a material that impregnates the winding portions and the insulation layer.

2. The inductive coil of claim 1 further comprising a second continuous non-conductive fiber strand extending around the circumference of the outer winding portion a plurality of times.

3. The inductive coil of claim 2 wherein the second continuous non-conductive fiber stand forms an outer layer around the circumference of the outer winding, and wherein the material encapsulating the coil impregnates the outer layer.

4. The inductive coil of claim 1 wherein the continuous non-conductive fiber strand extends around the circumference of the inner winding portion from one of the inner winding portion ends to the other inner winding portion end.

5. The induction coil of claim 4 further comprising a second non-conductive fiber strand extending around the circumference of the insulation layer a plurality of times from one end of the inner winding portion to the other end of the inner winding portion to form a second insulation layer between the inner and outer winding portions.

6. The inductive coil of claim 5 wherein the material encapsulating the coil impregnates the second insulation layer.

7. The inductive coil of claim 1 wherein each space separating the conductive bands is less than 1.5 time the thickness of every one of the conductive bands.

8. The inductive coil of claim 1 wherein the continuous non-conductive fiber strand comprises glass.

9. The inductive coil of claim 8 where the continuous non-conductive fiber strand comprises a thickness between 0.00030–0.00075 inch.

10. The inductive coil of claim 1 wherein the encapsulation material comprises polyimide.

11. The inductive coil of claim 1 wherein each of the winding portions comprises precision machined and rolled copper.

12. The inductive coil of claim 1 wherein each of the conductive bands comprises a tensile strength greater than 40,000 psi.

13. The inductive coil of claim 1 wherein each of the conductive bands comprises a yield strength greater than 30,000 psi.

14. The inductive coil of claim 1 wherein each of the conductive bands comprises a percent elongation less than 20%.

15. The inductive coil of claim 1 wherein each of the conductive bands comprises a hardness greater than a Brunell number of 70.

16. The inductive coil of claim 1 further comprising an electrically insulated metal flywheel coupled to an interior portion of the induction coil.

17. The inductive coil of claim 16 wherein the electrical insulation comprises an anodized outer surface of the flywheel, the anodized outer surface being in contact with the interior portion of the induction coil.

18. The inductive coil of claim 17 wherein the metal comprises aluminum.

* * * * *

UNITED STATES PATENT AND TRADEMARK OFFICE
CERTIFICATE OF CORRECTION

| | |
|---|---|
| PATENT NO. | : 6,864,613 B1 |
| APPLICATION NO. | : 09/538617 |
| DATED | : March 29, 2000 |
| INVENTOR(S) | : Yankie, Gerald W. et al. |

It is certified that error appears in the above-identified patent and that said Letters Patent is hereby corrected as shown below:

<u>Column 12</u>
Line 2, change "stand" to --strand--.

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 6,864,613 B1 Page 1 of 1
APPLICATION NO. : 09/538617
DATED : March 8, 2005
INVENTOR(S) : Gerald W. Yankie et al.

It is certified that error appears in the above-identified patent and that said Letters Patent is hereby corrected as shown below:

<u>Column 12</u>
Line 2, change "stand" to --strand--.

This certificate supersedes Certificate of Correction issued September 19, 2006.

Signed and Sealed this

Seventh Day of November, 2006

JON W. DUDAS
*Director of the United States Patent and Trademark Office*